T. A. LEWIS.
GRAIN THRESHING AND SEPARATING MACHINE.
APPLICATION FILED JUNE 15, 1911.
1,026,685.
Patented May 21, 1912.
3 SHEETS—SHEET 2.
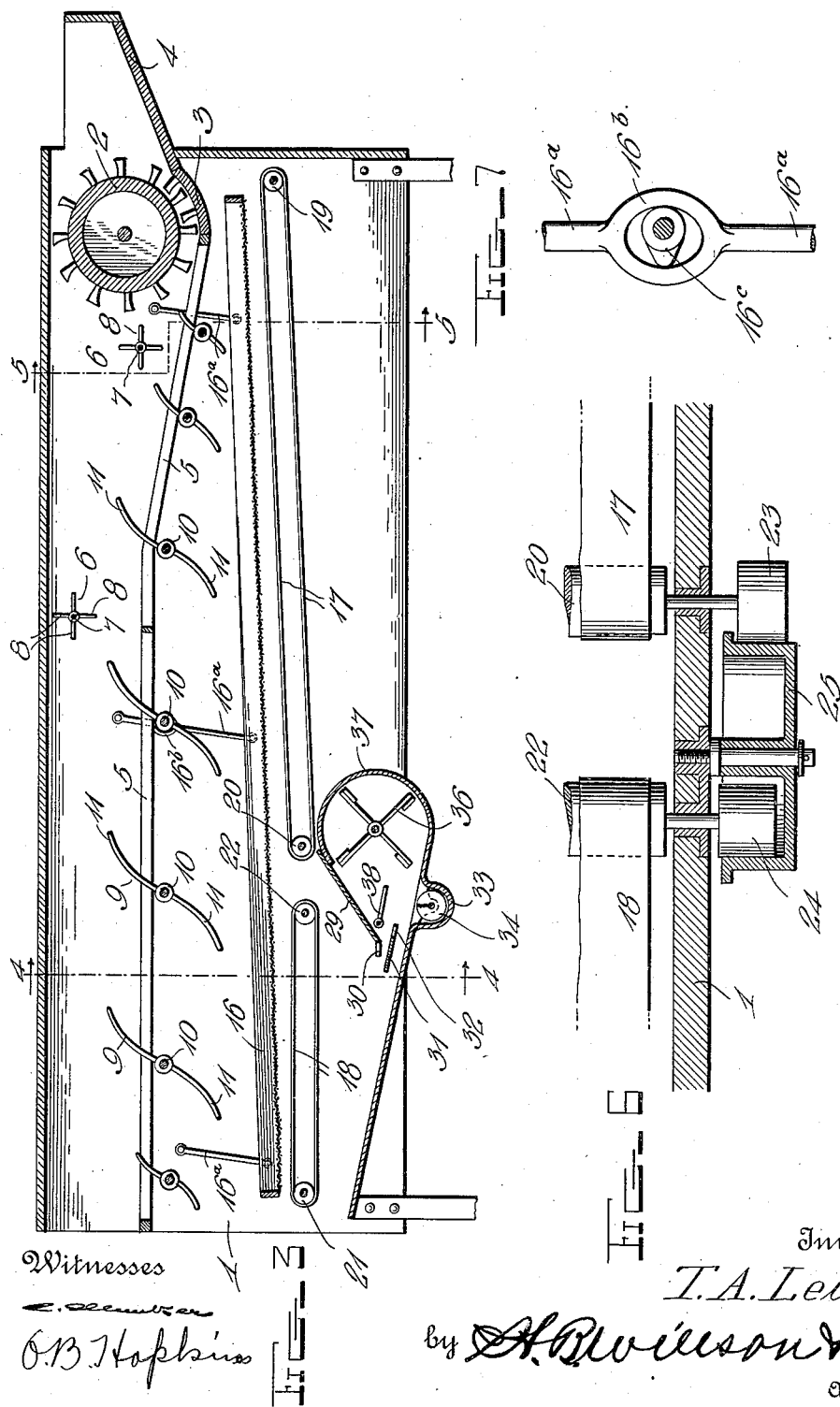

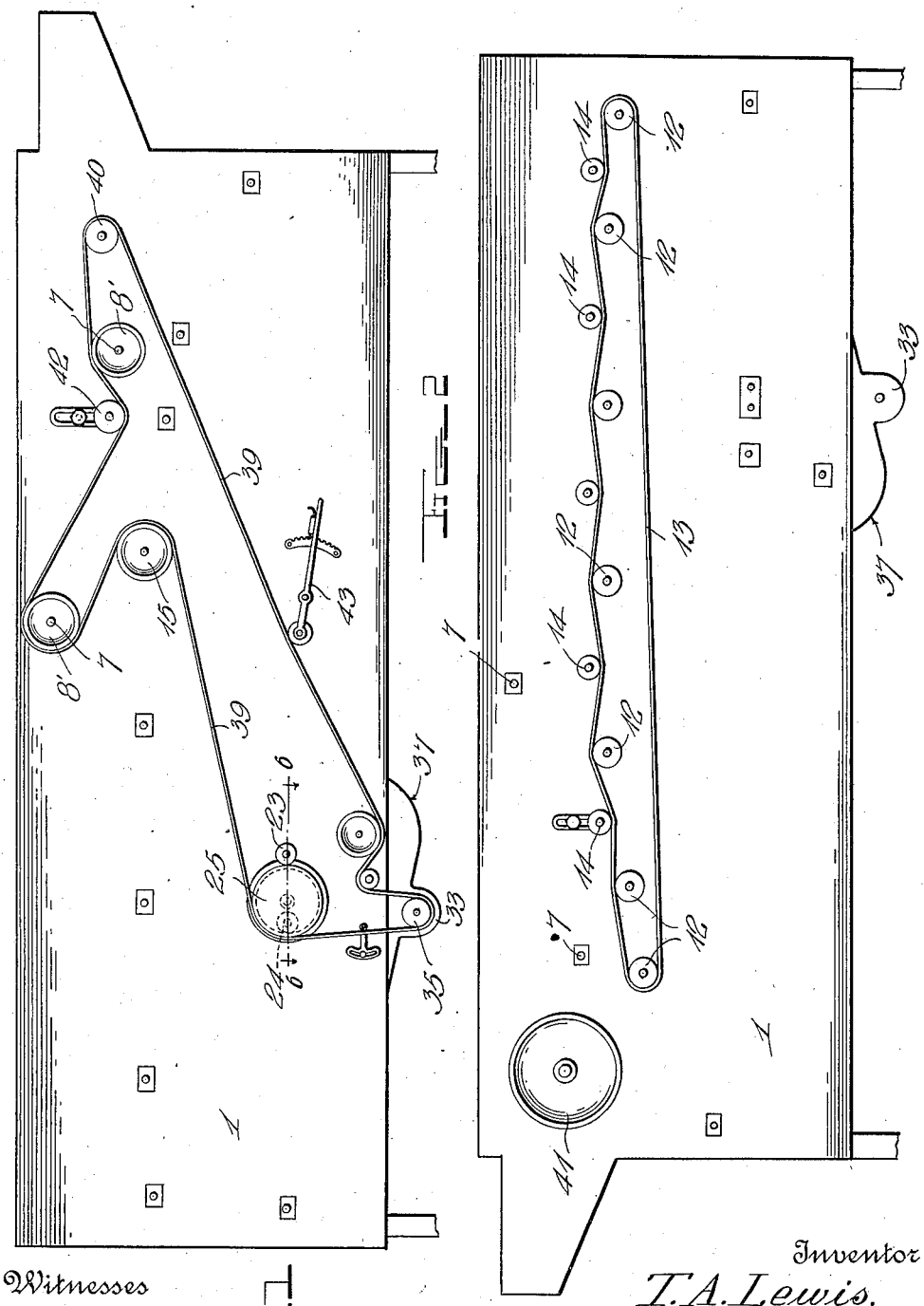

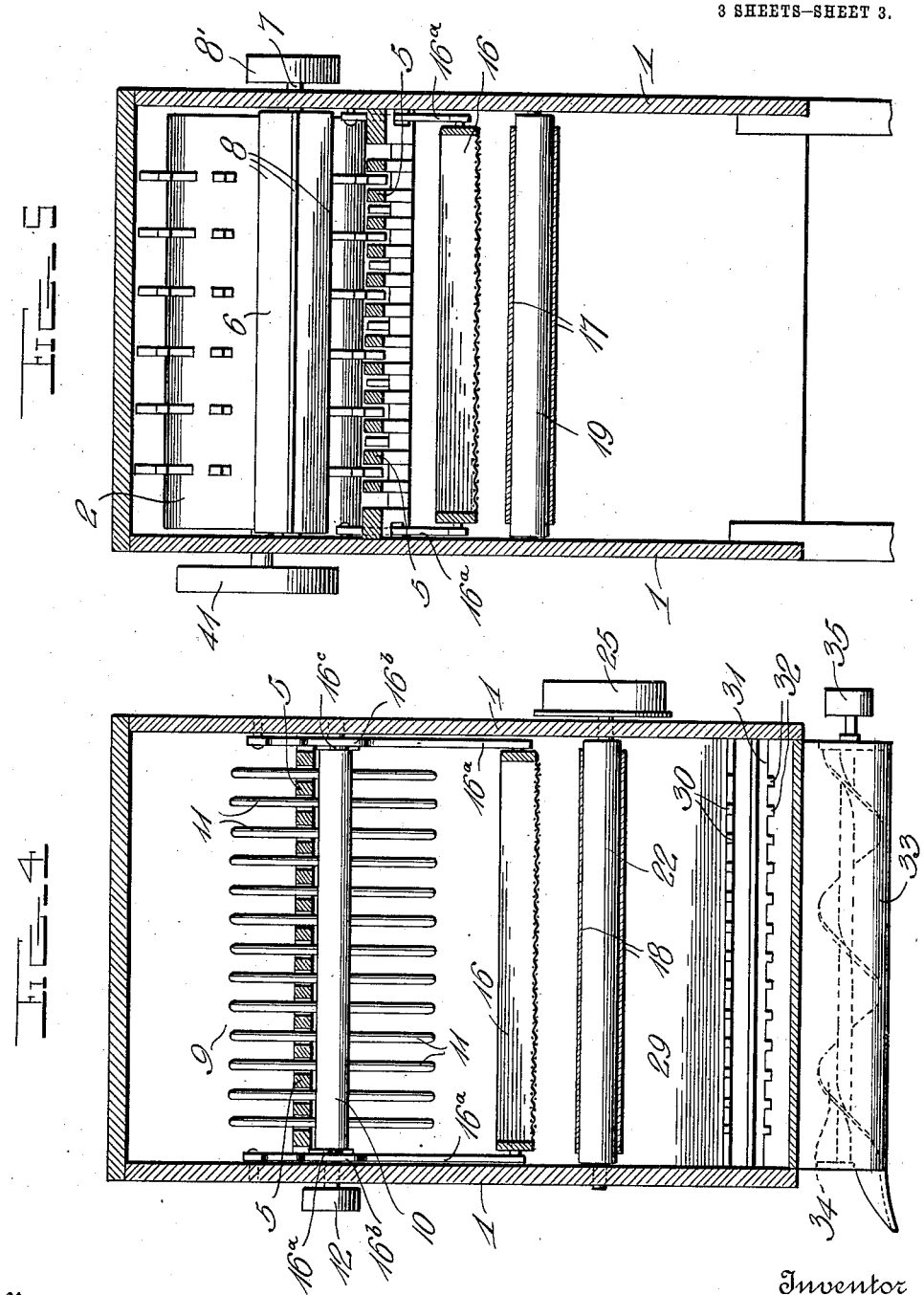

UNITED STATES PATENT OFFICE.

TURNER ASHLEY LEWIS, OF WINCHESTER, VIRGINIA.

GRAIN THRESHING AND SEPARATING MACHINE.

1,026,685.  Specification of Letters Patent.  Patented May 21, 1912.

Application filed June 15, 1911. Serial No. 633,373.

*To all whom it may concern:*

Be it known that I, TURNER A. LEWIS, a citizen of the United States, residing at Winchester, in the county of Frederick and State of Virginia, have invented certain new and useful Improvements in Grain Threshing and Separating Machines; and I do declare the following to be a full, clear, and exact description of the invention, such as will enable others skilled in the art to which it appertains to make and use the same.

This invention relates to improvements in grain threshing and separating machines.

One object of the invention is to provide a threshing machine having an improved arrangement of parts whereby the construction and operation of machines of this character is greatly simplified and whereby the machine is made stronger and more durable and the operation rendered more efficient.

With this and other objects in view, the invention consists of certain novel features of construction and the combination and arrangement of parts as will be more fully described and claimed.

In the accompanying drawings: Figure 1 is a side view of one side of the threshing and separating machine constructed in accordance with the invention; Fig. 2 is a side view of the opposite side thereof; Fig. 3 is a vertical longitudinal section; Fig. 4 is a vertical cross section on the line 4—4 of Fig. 3; Fig. 5 is a similar view on the line 5—5 of Fig. 3; Fig. 6 is a detail horizontal section through a portion of one side of the machine on the line 6—6 of Fig. 1 showing the manner in which the grain conveying aprons are driven; Fig. 7 is a detail side view of a portion of the cam operating mechanism for actuating the grain pan or chaffer.

In the embodiment of the invention I provide a suitable frame or casing 1 in the forward end of which is revolubly mounted a cylinder 2 below which is arranged a concave 3. The cylinder 2 and concave 3 may be of the usual or any suitable construction. Connected with the concave is a straw and grain feeding chute 4 and with the inner side of the concave is connected a longitudinally disposed inclined straw rack 5, said rack being constructed of a series of longitudinally disposed parallel bars which are spaced apart a suitable distance to permit the passage of the straw agitating mechanism hereinafter described.

Arranged at suitable positions in the upper portion of the machine above the forward portion of the straw rack 5 are rotary beaters 6, said beaters comprising transversely disposed cylinders or rolls provided with shafts or trunnions 7 which project through and are revolubly mounted in the opposite sides of the frame or casing of the machine as shown. On the cylinders or rolls are arranged radially projecting diametrically arranged beater blades 8 which are adapted to engage and beat the straw down on to the adjacent portion of the rack. The shafts or journals of one end of the beaters are provided with belt pulleys 8′, whereby the beaters are operated in a manner hereinafter described.

Revolubly mounted at suitable intervals immediately below the straw rack is a series of pickers 9, said pickers comprising transversely disposed hubs or cylinders 10 having shafts or journals, the ends of which project through and are revolubly mounted in the opposite sides of the frame or casing of the machine. Secured to the hubs or cylinders 10 are a series of picker fingers 11 which project radially and are curved in opposite directions as shown. The fingers 11 are so arranged on the hubs or cylinders that when revolved, said fingers will pass between the bars of the straw rack and thus lift and shake the straw after the latter has been acted upon by the threshing mechanism and beaters, thus loosening and shaking any grain which may remain in the straw and causing said grain to pass between the bars or slats or the straw rack. The picker fingers also convey the straw rearwardly over the straw rack and discharge the straw from the rear or discharge end of the machine. On one end of the shafts or journals of each of the pickers adjacent to one side of the machine are fixedly mounted drive pulleys 12. With the pulleys of the pickers at the front and rear ends of the machine is engaged a wheel driving belt 13, the upper stretch of which is operatively engaged with the pulleys 12 on the intermediate picker shafts whereby the movement of one of the pickers is imparted to the rest of the same. The upper stretch of the belt 13 is held in operative engagement with the pulleys of the intermediate pickers by idle pulleys 14 which are suitably mounted above the belt on the adjacent side of the casing. On the shaft or journal of one of the pickers is fixedly mounted a main picker driving pulley 15 with which is engaged the main driving mechanism of the machine, as will be hereinafter described.

Arranged below the straw rack and spaced a suitable distance therefrom is a chaffer or grain pan 16 having a screen or perforated bottom onto which the grain and chaff threshed from the straw is adapted to drop and by means of which the grain and smaller particles of chaff pass. The grain pan or chaffer 16 is pivotally supported or hung on pairs of hanger bars 16$^a$ which are pivotally connected at their upper ends to the inner sides of the frame or casing of the machine. In one pair of the hanger bars 16$^a$ are formed elliptical shaped eccentric rings 16$^b$ with which are engaged chaffer operating cams or eccentrics 16$^c$ which are fixedly mounted on the shaft of one of the pickers 9 whereby said cams or eccentrics are revolved in the rings 16$^b$ of the hangers 16$^a$, thus swinging said hangers and imparting a reciprocating movement to the chaffer or grain pan. In passing through the screen bottom of the chaffer or grain pan the grain and chaff fall onto the endless grain conveying aprons 17 and 18 arranged below the grainpan or chaffer as shown. The endless apron 17 is arranged on and driven by supporting and operating rollers 19 and 20 journaled in the sides of the frame or casing as shown. The apron 18 is supported on and driven by supporting and operating rollers 21 and 22 which are also revolubly mounted in the frame or casing of the machine. On one end of the roller 20 is fixedly mounted a friction drive pulley 23, while on the adjacent end of the roller 22 is fixedly mounted a friction drive pulley 24.

Revolubly mounted on the side of the casing between the pulleys 23 and 24 is an apron driving pulley 25, the upper face of which is in operative engagement with the pulley 23 of the apron operating roller 20, while the inner face of the rim of the pulley 25 is adapted to engage the pulley 24 of the apron operating roller 22. By thus arranging the main apron driving pulley 25 and the apron driving pulleys 23 and 24 of the rollers 20 and 22 the latter will be operated in the proper direction to run the grain conveying aprons 17 and 18 toward each other, whereby the grain and chaff falling thereon will be discharged therefrom between their adjacent inner ends.

The grain and chaff when thus discharged from the aprons falls onto an upper inclined grain board 29 having on its lower end a series of longitudinally extending fingers 30. The grain and chaff falling on the upper inclined board 29 will slide down the same and drop between the fingers 30 on to a lower inclined grain board or chute 31 which is disposed a suitable distance below the upper board and inclined in the opposite direction, as shown. On the lower edge of the lower board 31 is arranged a series of fingers 32 through which the grain drops. The grain in dropping from the board 31 falls into the trough 33 of a grain auger or spiral conveyer 34 which is arranged in the lower portion of the frame or casing. The grain falling into the trough 33 is discharged by the conveyer 34 from one side of the machine and into suitable receptacles provided to receive the same. On one end of the conveyer 34 is arranged a drive pulley 35 with which is engaged the main operating mechanism hereinafter described.

The grain and chaff in falling from the grain board 29 is subjected to a blast of air blown through the falling grain by a fan 36 arranged in a suitable casing 37 secured to the bottom of the machine as shown. Pivotally mounted below the grain board 29 and within the casing 37 is an air deflecting board or plate 38 which is adapted to be adjusted in any suitable manner for the purpose of deflecting or changing the current of the air blast from the fan so that it may be directed more or less downward onto the board 31, more or less upward beneath the board 29 and through its fingers 30, or (as shown in Fig. 3) along a line substantially parallel with the board 31 and between it and the fingers 30 of the upper board 29. I have found by experience that there is a wide difference in the character of the material delivered from a threshing machine, that even the same machine acting on the same material in the rough will deliver it in different conditions after treatment, the condition depending upon the climate, the weather, the barometer, and various other collaterals; and also that different machines made in the same way and supposed to have the same effect upon the material treated, will turn out different products when there has been no change in the weather or other conditions just mentioned. To neutralize these variations in as far as possible and to secure as a product a grain substantially free of all chaff is of course the object of all manufacturers of these machines, and I have found by experiment that while other parts of the machine need little if any adjustment a deflection of the air currents from the fan through or across the path of the falling mixture of grain and chaff plays an extremely important part on the result. Hence the disposition of the air deflecting plate 38 under the upper board 29 and above the lower board 31, and between both of them and the fan 36, and the disposition of the fingers 30 of one board in reversed position to the fingers 32 of the other board. The blast of air when thus blown through the grain and chaff falling from the upper grain board 29 will blow the chaff and impurities from the grain so that only the clean perfect kernels of the grain will drop onto the lower board 31 and from thence be discharged into the trough 33 of the conveyer. The chaff when thus separated from the grain will be blown out of the rear or discharge end of the machine below the grain conveying apron 18.

The various moving parts of the working mechanism of the machine are simultaneously operated by a single endless belt 39 which is engaged with the drive pulleys of the respective parts as clearly shown in Fig. 1 of the drawings and with a pulley 40 fixedly mounted on one end of the shaft of the threshing cylinder, said shaft having on its opposite end a main drive pulley 41 with which a power belt is engaged when mechanical power is employed. When horse power is employed for operating the machine, the cylinder is connected therewith in any suitable manner. The upper stretch of the belt 39 is held in operative engagement with the pulleys driven thereby by means of an adjustable belt tightener 42 secured to the adjacent side of the machine, while the lower stretch of the belt 39 is held in engagement with the pulleys driven thereby by means of an adjustable belt tightener 43 arranged on the adjacent side of the machine and preferably constructed as shown. By constructing and arranging the machine as herein shown and described, it will be seen that many of the parts required and employed in the usual construction of threshing and separating machines are dispensed with without detracting from the general efficiency and thorough operation of the machine, thus simplifying the construction and operation and reducing the cost of manufacturing machines of this character. It will be further noted that all of the working parts are driven by a single belt adapted to be connected with the cylinder or some other driven part of the machine to which the power is applied.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the claimed invention.

Having thus described my invention, what I claim is:

In a grain threshing and separating machine, the combination with the threshing mechanism, the rotary pickers, and a cam fixedly mounted on one of the picker shafts; of the grain pan, a series of hanger bars supporting it beneath the pickers, one of said bars having an eccentric ring formed therein and loosely embracing said cam, and means for rotating the shaft on which the cam is mounted.

In testimony whereof I have hereunto set my hand in presence of two subscribing witnesses.

TURNER ASHLEY LEWIS.

Witnesses:
J. T. ATKINS,
H. B. WHITING.

Copies of this patent may be obtained for five cents each, by addressing the "Commissioner of Patents, Washington, D. C."